(12) United States Patent
Ohtsuka

(10) Patent No.: US 12,345,597 B2
(45) Date of Patent: Jul. 1, 2025

(54) MODE-DEPENDENT LOSS MEASUREMENT DEVICE AND MODE-DEPENDENT LOSS MEASUREMENT METHOD

(71) Applicant: SUMITOMO ELECTRIC INDUSTRIES, LTD., Osaka (JP)

(72) Inventor: Takafumi Ohtsuka, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 162 days.

(21) Appl. No.: 18/347,717

(22) Filed: Jul. 6, 2023

(65) Prior Publication Data

US 2024/0011866 A1 Jan. 11, 2024

(30) Foreign Application Priority Data

Jul. 11, 2022 (JP) ................................ 2022-110969

(51) Int. Cl.
*G01M 11/00* (2006.01)
*G02B 6/02* (2006.01)

(52) U.S. Cl.
CPC ........ *G01M 11/333* (2013.01); *G01M 11/331* (2013.01); *G01M 11/335* (2013.01); *G02B 6/02042* (2013.01)

(58) Field of Classification Search
CPC .... G01M 11/30; G01M 11/33; G01M 11/331; G01M 11/332; G01M 11/333;

(Continued)

(56) References Cited

U.S. PATENT DOCUMENTS 5,251,002 A * 10/1993 Gryk ...................... G01M 11/33
356/73.1
8,774,574 B2 * 7/2014 Xie ..................... H04B 10/2581
398/143

(Continued)

FOREIGN PATENT DOCUMENTS

CN 114739633 A * 7/2022

OTHER PUBLICATIONS

M. Wada, et al., "Cladding Pumped Randomly Coupled 12-Core Erbium-Doped Fiber Amplifier With Low Mode-Dependent Gain", Journal of Lightwave Technology, vol. 36, No. 5, Mar. 1, 2018, p. 1220.

(Continued)

*Primary Examiner* — Gordon J Stock, Jr.
(74) *Attorney, Agent, or Firm* — IPUSA, PLLC

(57) ABSTRACT

An apparatus includes an element to transmit a partial amount of first light guided through the M cores of a target object and second light guided through M optical waveguides, and to reflect remaining amount thereof, a first modulator to individually modulate the first light, a first detector to output a first signal based on the first light reflected by the element and the second light passing through the element, a second detector to output a second signal based on the first light passing through the element and the second light reflected by the element, an optical system configured such that the first light and the second light overlap in pairs on the first and second detectors, and a processing unit configured to output information about mode-dependent loss of the target object based on the first signal, the second signal, and information about modulation given by the first modulator.

18 Claims, 7 Drawing Sheets

(58) Field of Classification Search
CPC ............. G01M 11/334; G01M 11/335; G01M 11/336; G01M 11/337; G01M 11/338; H04B 10/07; H04B 10/073; H04B 10/0731; G02B 6/020242; G02B 6/0288
See application file for complete search history.

(56) References Cited

U.S. PATENT DOCUMENTS

| | | | |
|---|---|---|---|
| 9,835,520 B2 * | 12/2017 | Hayashi | ............... G01M 11/334 |
| 10,345,192 B2 * | 7/2019 | Chen | .................. G01M 11/3127 |
| 11,022,523 B2 * | 6/2021 | Hayashi | .................... G02B 6/02 |
| 11,035,754 B2 * | 6/2021 | Neilson | ............... G01M 11/3172 |
| 11,754,466 B2 * | 9/2023 | Hasegawa | ............ G01M 11/335 |
| | | | 356/73.1 |

OTHER PUBLICATIONS

J. C. Alvarado-Zacarias, et al., "Characterization of Coupled-Core Fiber Amplifiers Using Swept-Wavelength Interferometer", OFC2019, Th1B.6.

* cited by examiner

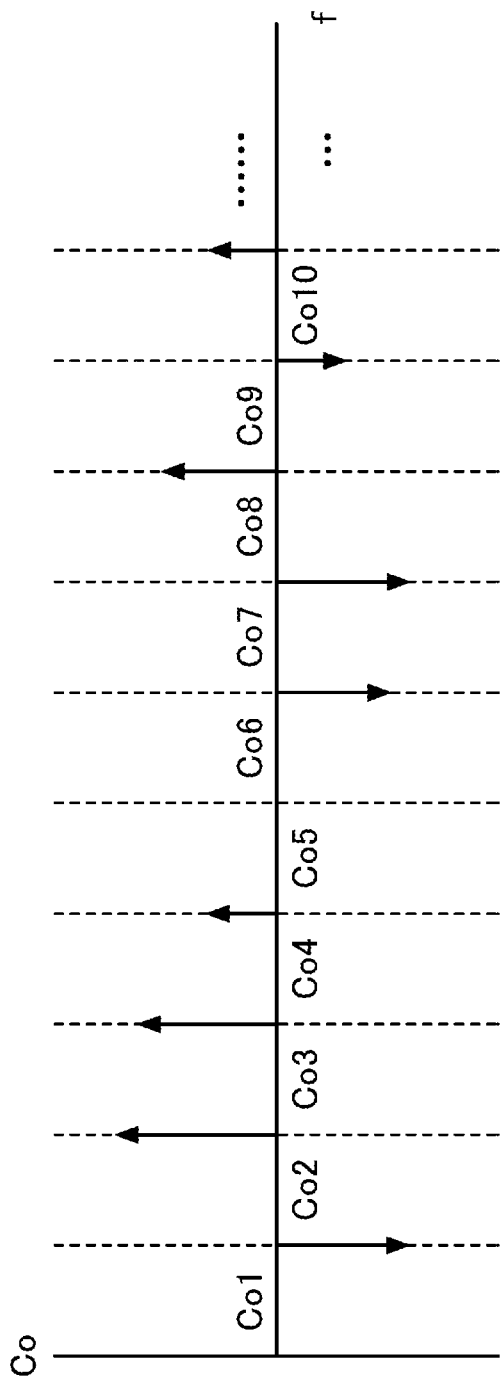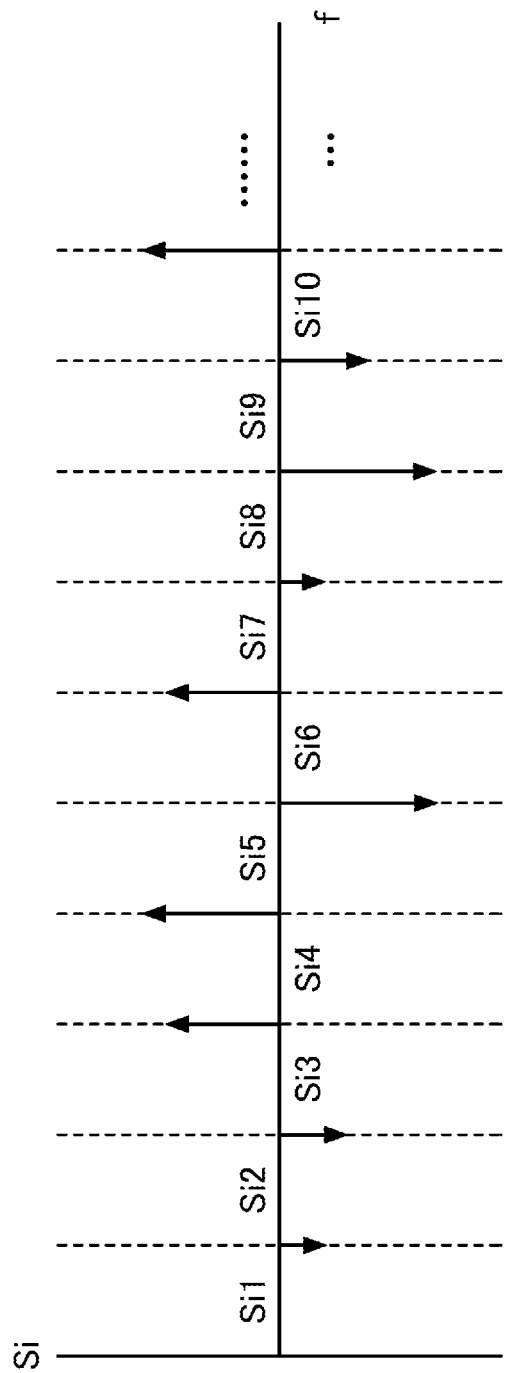

US 12,345,597 B2

MODE-DEPENDENT LOSS MEASUREMENT DEVICE AND MODE-DEPENDENT LOSS MEASUREMENT METHOD

TECHNICAL FIELD

The present disclosure relates to mode-dependent loss measurement apparatuses and mode-dependent loss measurement methods.

The present application is based on and claims priority to Japanese patent application No. 2022-110969 filed on Jul. 11, 2022, with the Japanese Patent Office, the entire contents of which are hereby incorporated by reference.

BACKGROUND

Mode-multiplexed optical transmission using multi-core optical fibers uses a multi-core optical device including M cores, which are surrounded by a common cladding and each of which guides light. M is a natural number greater than or equal to 2. Examples of a multi-core optical device include optical fibers, optical amplifiers, optical combiners, optical isolators, etc. Techniques for measuring the mode-dependent loss (MDL), which is the difference in loss between modes propagating in such a multi-core optical device, are known in the art (For example, M. Wada, et al., "Cladding Pumped Randomly Coupled 12-Core Erbium-Doped Fiber Amplifier with Low Mode-Dependent Gain," JOURNAL OF LIGHTWAVE TECHNOLOGY, VOL. 36, NO. 5, Mar. 1, 2018, P1220 (Non-Patent Document 1)).

Non-Patent Document 2 (J. C. Alvarado-Zacarias, et al., "Characterization of Coupled-Core Fiber Amplifiers Using Swept-Wavelength Interferometer," OFC2019, Th1B.6.) discloses a technique that couples probe light into a multi-core optical device through a fan-in device, and measures the mode-dependent loss of the multi-core optical device based on the probe light separated on a core-by-core basis and emitted from a fan-out device after passing through the target object. The fan-in device is an optical device configured to cause light to be individually injected into each core of the multi-core optical device. The fan-out device is an optical device configured to individually guide light emitted from each core of the multi-core optical device.

SUMMARY

According to one aspect of the present disclosure, a mode-dependent loss measurement apparatus for measuring a target object containing M cores each guiding light, where M is a natural number greater than or equal to two, includes M optical waveguides, an optical element configured to transmit a partial amount of first light guided through the M cores of the target object and a partial amount of second light guided through the M optical waveguides, and to reflect remaining amount thereof, a first modulation unit configured to individually modulate a plurality of beams of the first light guided through the M cores before entering the M cores, a first optical detector configured to output a first received signal based on the first light emitted from the M cores and reflected by the optical element and the second light emitted from the M optical waveguides and passing through the optical element, a second optical detector configured to output a second received signal based on the first light emitted from the M cores and passing through the optical element and the second light emitted from the M optical waveguides and reflected by the optical element, an optical system configured to guide the first light and the second light such that the plurality of beams of the first light and a plurality of beams of the second light overlap in pairs on the first optical detector and the second optical detector, and a processing unit configured to output information about mode-dependent loss of the target object based on the first received signal, the second received signal, and information about modulation given by the first modulation unit.

BRIEF DESCRIPTION OF THE DRAWINGS

FIG. 5A is a drawing illustrating an example of the cosine components of a complex spectrum output from a differential amplifier according to the second embodiment;

FIG. 5B is a drawing illustrating the sine components of the complex spectrum output from the differential amplifier according to the second embodiment;

DETAILED DESCRIPTION

Figure 1:
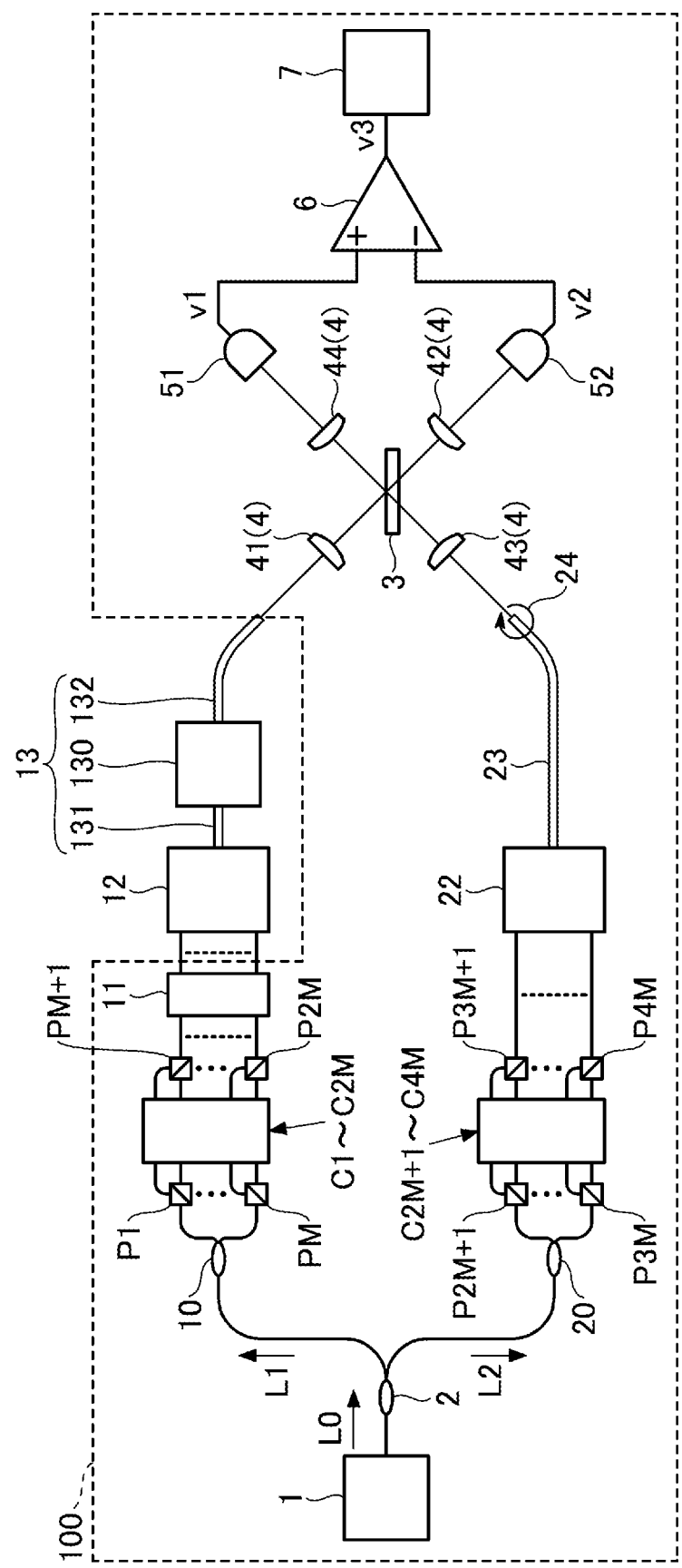
FIG. 1 is a drawing illustrating an example of the configuration of a mode-dependent loss measurement apparatus according to a first embodiment.

In the techniques disclosed in Non-Patent Documents 1 and 2, measurement is performed while keeping a target object such as a multi-core optical device sandwiched between a light input member such as a fan-in device and a light output member such as a fan-out device. As a result, the mode-dependent loss of the light inputting member and the mode-dependent loss of the light outputting member are each included in the measurement results. There is thus room for improvement in the reliability of measuring the mode-dependent loss of a target object.

Accordingly, there may be a need to provide a mode-dependent loss measurement apparatus and a mode-dependent loss measurement method with excellent measurement reliability.

According to the present disclosure, mode-dependent loss measurement equipment and mode-dependent loss measurement method with excellent measurement reliability can be provided.

DESCRIPTION OF EMBODIMENTS

In the following, the embodiments of the present disclosure will be listed and described.

(1) According to one aspect of the present disclosure, a mode-dependent loss measurement apparatus for measuring a target object containing M cores each guiding light, where M is a natural number greater than or equal to two, includes M optical waveguides; an optical element configured to transmit a partial amount of first light guided through the M cores of the target object and a partial amount of second light guided through the M optical waveguides, and to reflect remaining amount thereof; a first modulation unit configured to individually modulate a plurality of beams of the first light guided through the M cores before entering the M cores; a first optical detector configured to output a first received signal based on the first light emitted from the M cores and reflected by the optical element and the second light emitted from the M optical waveguides and passing through the optical element; a second optical detector configured to output a second received signal based on the first light emitted from the M cores and passing through the optical element and the second light emitted from the M optical waveguides and reflected by the optical element; an optical system configured to guide the first light and the second light such that the plurality of beams of the first light and a plurality of beams of the second light overlap in pairs on the first optical detector and the second optical detector, and a processing unit configured to output information about mode-dependent loss of the target object based on the first received signal, the second received signal, and information about modulation given by the first modulation unit.

With the above-noted configuration, the mode-dependent loss measurement apparatus can cause the plurality of beams of the first light passing through the M cores and the plurality of beams of the second light passing through the M optical waveguides to overlap in pairs without having a light output member such as a fanout device guiding the plurality of beams of the first light emitted from the M cores of the target object. This enables the mode-dependent loss measurement apparatus to output information about the mode-dependent loss of the target object based on the first and second received signals. The fact that the result of measurement does not include the mode-dependent loss of a light output member enables the realization of a mode-dependent loss measurement apparatus having superior measurement reliability compared to the case in which the result of measurement includes the mode-dependent loss of both a light input member and a light output member. The term "modulation information" refers to information about modulated phase, frequency, both phase and frequency, amplitude, or the like. Also, the term "in pairs" may be rephrased as "in one-to-one correspondence."

(2) In the configuration described in (1), the plurality of beams of the first light may be injected into the M cores through a light input member, and the processing unit may be configured to output the information about the mode-dependent loss of the target object further based on information about a complex transfer matrix of the light input member acquired in advance.

When the first light enters the M cores through a light input member such as a fan-in device, the information about the mode-dependent loss of the target object, which is output from the processing unit, includes the mode-dependent loss of the light input member, which results in the lowering of measurement reliability. The pre-acquired information about the mode-dependent loss of the light input member may be used in processing to remove the mode-dependent loss of the light input member from the output of the processing unit, i.e., the information about the mode-dependent loss of the target object. This arrangement enables the realization of a mode-dependent loss measurement apparatus having excellent measurement reliability.

(3) In the configuration described in (1) or (2), the optical system may form images of exit ends of the M cores and images of exit ends of the M optical waveguides on the first optical detector and the second optical detector.

Forming images with the optical system allows the first light emitted from the M cores and the second light emitted from the M optical waveguides to easily overlap each other on the first optical detector and the second optical detector. This arrangement may reduce measurement errors responsive to the degree of overlap between the first light and the second light.

(4) In the configuration described in any one of (1) to (3), an adjustment mechanism may be further provided to make an adjustment of either the optical system or the M optical waveguides such that the plurality of beams of the first light and the plurality of beams of the second light overlap in pairs on each of the first optical detector and the second optical detector, wherein the adjustment mechanism is configured to make the adjustment such that a beam-center-to-beam-center distance between the first light and the second light on each of the first optical detector and the second optical detector is less than or equal to 10% of a square root of sum of squares calculated for mode field radii of the target object and the M optical waveguides. This adjustment enables measurement errors responsive to the degree of overlap between the first light and the second light to be less than 2%.

(5) In the configuration described in any one of (1) to (4), a second modulation unit may be further provided to individually modulate the plurality of beams of the second light guided through the M optical waveguides before entering the M optical waveguides, wherein the processing unit is configured to output the information about the mode-dependent loss of the M cores further based on information about modulation given by the second modulation unit.

In order to measure the mode-dependent loss of each of the M cores individually, it is necessary to discriminate and detect the plurality of beams of the first light passing through the M cores. M first optical detectors and M second optical detectors may be provided in one-to-one correspondence with the plurality of beams of the second light to discriminate the plurality of beams of the first light, for example. However, such an arrangement may result in the device configuration becoming complicated, or result in an increase in the device size. Use of the modulation information given by the second modulation unit allows the plurality of beams of the first light passing through the M cores to be discriminated and detected using one first optical detector and one second optical detector. As a result, the mode-dependent loss of each of the M cores can be measured separately while avoiding a complicated device configuration and an increase in the device size.

(6) In the configuration described in (5), the first light and the second light may each include two orthogonal polarizations, wherein the first modulation unit is configured to modulate 2M beams of the first light that correspond to the two orthogonal polarizations of the plurality of beams of the first light guided through the M cores, and the second modulation unit is configured to modulate 2M beams of the second light that correspond to the two orthogonal polarizations of the plurality of beams of the second light guided through the M optical waveguides. This arrangement allows the mode-dependent loss of each of the M cores to be measured separately using two orthogonal polarizations.

(7) In the configuration described in (6), the first modulation unit may introduce respective optical delays to the 2M beams of the first light, and the second modulation unit may introduce respective optical delays to the 2M beams of the second light. This arrangement using optical delays allows each of the 2M beams of the first light and each of the 2M beams of the second light to be modulated with a simple configuration.

(8) In the configuration described in (6), an optical delay may be introduced between two orthogonal polarizations in the first light, and, thereafter, the first modulation unit may introduce respective optical delays to at least M−1 beams among M beams of the first light obtained by splitting the first light, and an optical delay may be introduced between two orthogonal polarizations in the second light, and, thereafter, the second modulation unit may introduce respective optical delays to at least M−1 beams among M beams of the second light obtained by splitting the second light. This arrangement allows the number of components for providing optical delays to be reduced compared with the case in which an optical delay line is provided separately for each of the 2M beams of the first light and the 2M beams of the second light. Here, the term "splitting" refers to dividing one light beam into multiple light beams.

(9) In the configuration described in any one of (6) to (8), the first modulation unit may be configured to modulate the first light with first through 2M-th modulation signals, and the second modulation unit may be configured to modulate the second light with 2M+1-th through 4M-th modulation signals, wherein a product of m-th and n-th modulation signals belonging to the first through 4M-th modulation signals is a linear combination of i-th and j-th functions belonging to an orthogonal function system. This arrangement allows the components of a complex transfer matrix to be determined based on the relationship between the frequencies of the two modulation signals and the frequency of the signal that is the product of the two modulation signals.

(10) In the configuration described in any one of (1) to (9), a first light source may be provided, wherein the first light is part of light from the first light source, and the second light is a remaining part of the light from the first light source other than the first light. This arrangement using light from the common first light source as the first light and the second light ensures high-level coherence between the first light and the second light, thereby allowing the mode-dependent loss to be measured by coherent detection.

(11) In the configuration described in (10), the first light source may include a tunable laser capable of generating continuous wavelength sweep in emitted laser light. This arrangement using a tunable laser capable of generating continuous wavelength sweep allows the first light and the second light to be modulated with a simple configuration.

(12) In the configuration described in (10), the first light source may include a tunable laser or a stabilized wavelength laser, and may include an M-sequence modulation unit configured to apply binary phase-shift keying modulation with an M-sequence signal to light from the tunable laser or the stabilized wavelength laser. This arrangement allows the output light of the first light source to be more stable than in the case of continuous frequency sweep, thereby improving the accuracy of measurement of mode-dependent loss. The term "M-sequence signal" refers to the maximum length sequence (MLS) signal, which possesses both regularity and irregularity. The binary phase-shift keying modulation is one type of phase shift modulation that expresses a signal by discontinuously changing the phase of light and that switches between two phases of light having a 180-degree phase difference.

(13) In the configuration described in (10), a second light source and a light combining member may be provided, wherein the light combining member is configured to combine light from the second light source with the first light from the first light source, and light generated by the light combining member is injected into each of the M cores.

When the target object is an erbium-doped optical fiber amplifier or the like, background light, which is used to reproduce the wavelength multiplexed light that determines the operating conditions of the target object, may be required separately from the first light used for measurement. This arrangement injecting the light combined by the light combining member into each of the M cores enables the reproduction of wavelength multiplexed light, thereby allowing the mode-dependent loss of the target object such as an erbium-doped optical fiber amplifier to be measured.

(14) In the configuration described in any one of (1) to (13), the M optical waveguides may include uncoupled multi-core optical fibers. This arrangement using the optical waveguides that include uncoupled multi-core optical fibers allows the mode-dependent loss to be reduced in the optical paths guiding the second light, thereby ensuring highly accurate measurement with respect to the mode-dependent loss of the target object.

(15) In the configuration described in any one of (1) to (14), the M optical waveguides may include single-core optical fibers. This arrangement using the optical waveguides that include single-core optical fibers allows the mode-dependent loss to be reduced in the optical paths guiding the second light, thereby ensuring highly accurate measurement with respect to the mode-dependent loss of the target object.

(16) In the configuration described in any one of (10) to (13), a self-delay interferometer may be provided, wherein the processing unit is configured to compensate for phase noise of the light from the first light source based on an output of the self-delay interferometer responsive to the light from the first light source. This arrangement compensating for the phase noise of the light from the first light source allows errors in the complex transfer matrix calculated by the processing unit to be reduced, thereby ensuring highly accurate measurement with respect to the mode-dependent loss of the target object. The self-delay interferometer is an interferometer in which an optical delay shorter than the coherence length of light is introduced to one of the two split light beams, and a beat frequency is detected between the delayed light and the other one of the two split light beams. The beat frequency is the frequency of a beat wave produced when two waves with slightly different frequencies interfere. The phase noise is random variation in the phase of light corresponding to a deviation from the perfect periodicity in the time domain, and is expressed in the frequency domain.

(17) According to one aspect of the present disclosure, a mode-dependent loss measurement method implemented by a mode-dependent loss measurement apparatus for measuring a target object containing M cores each guiding light, where M is a natural number greater than or equal to two, includes causing an optical element to transmit a partial amount of first light guided through the M cores of the target object and a partial amount of second light guided through M optical waveguides, and to reflect remaining amount thereof; causing a first modulation unit to individually modulate a plurality of beams of the first light guided through the M cores before entering the M cores; causing a first optical detector to output a first received signal based on the first light emitted from the M cores and reflected by the optical element and the second light emitted from the M optical waveguides and passing through the optical element; causing a second optical detector to output a second received signal based on the first light emitted from the M cores and passing through the optical element and the second light emitted from the M optical waveguides and reflected by the optical element; and causing an optical system to guide the first light and the second light such that the plurality of beams of the first light and a plurality of beams of the second light overlap in pairs on the first optical detector and the second optical detector, and causing a processing unit to output information about mode-dependent loss of the target object based on the first received signal, the second received signal, and information about modulation given by the first modulation unit.

As in the configuration described in (1), the fact that the result of measurement obtained by this method does not include the mode-dependent loss of a light output member enables the realization of a mode-dependent loss measurement apparatus having superior measurement reliability compared with the case in which the result of measurement includes the mode-dependent loss of both a light input member and a light output member.

(18) In the configuration described in (17), the plurality of beams of the first light may be injected into the M cores through a light input member, and the mode-dependent loss measurement method may further cause the processing unit to: obtain a composite complex transfer matrix of the light input member and the target object based on the first light passing through the light input member and the target object; obtain a complex transfer matrix of the light input member based on the first light passing through the light input member, without passing through the target object; obtain a complex transfer matrix of the target object by post-multiplying the composite complex transfer matrix by an inverse matrix of the complex transfer matrix of the light input member; and output the information about the mode-dependent loss of the target object based on the complex transfer matrix of the target object.

As in the configuration described in (2), the mode-dependent loss of the light input member can be removed from the information about the mode-dependent loss of the target object output from the processing unit, which enables the realization of a mode-dependent loss measurement apparatus having excellent measurement reliability.

DETAILS OF EMBODIMENTS OF DISCLOSURE

In the following, specific examples of a mode-dependent loss measurement apparatus according to an embodiment of the disclosure will be described with reference to the accompanying drawings. It should be noted that the invention is not limited to these examples, but is intended to be defined in the claims and also to include all modifications within the spirit and scope of the claims. In the following descriptions, the same elements or elements having the same function will be referred to by the same reference characters, and a duplicate description thereof may be omitted as appropriate.

First Embodiment

<Example of Configuration of Mode-Dependent Loss Measurement Device>

FIG. 1 illustrates an example of the configuration of a mode-dependent loss measurement apparatus 100 according to a first embodiment. The mode-dependent loss measurement apparatus 100 is configured to measure the mode-dependent loss of a target object 13 including M cores, each of which guides light. M is a natural number of 2 or more. The target object 13 is a multi-core optical device or the like.

As illustrated in FIG. 1, the target object 13 includes a target body 130, an input-side MCF (multi-core fiber) 131, and an output-side MCF 132. The target body 130 is the part that imparts the functions of a multi-core optical device to the target object 13. For example, in the case in which the target object 13 is an optical amplifier, the target body 130 is the part that amplifies light. The input-side MCF 131 is a multi-core optical fiber provided on the side where light enters the target body 130. The output-side MCF 132 is a multi-core optical fiber provided on the side where light exits from the target body 130.

The target body 130, the input-side MCF 131, and the output-side MCF 132 each have cores. The cores of the target body 130, the cores of the input-side MCF 131, and the cores of the output-side MCF 132 are connected in one-to-one correspondence to form M cores of the target object 13. In other words, the target object 13 has M cores each of which is formed by connecting one core in the input-side MCF 131, one core in the target body 130, and one core in the output-side MCF 132. Alternatively, the target object 13 may not have either the input-side MCF 131 and the output-side MCF 132, and may consist only of the target body 130. For example, in the case in which the target object 13 is a multi-core optical fiber, the target object 13 may consist only of a multi-core optical fiber serving as the target body 130.

Light enters the M cores of the target object 13 at the input end of the input-side MCF 131 through a first fan-in device 12. The first fan-in device 12 is an example of a light input member. The first fan-in device 12 has M single-mode optical fibers and couples light into the M cores of the multi-core optical fiber through the respective M single-mode optical fibers. Light passing through the M cores of the target object 13 exit from the output end of the output-side MCF 132.

As illustrated in FIG. 1, the mode-dependent loss measurement apparatus 100 includes a first light source 1, a first optical splitter 2, a second optical splitter 10, a third optical splitter 20, polarization elements P1 through P4M, optical modulators C1 through C4M, an optical interface 11, a second fan-in device 22, M optical waveguides 23 (a bundle of which is illustrated as a single element in FIG. 1, for the sake of convenience), and an adjustment mechanism 24. The mode-dependent loss measurement apparatus 100 also includes an optical element 3, an optical system 4, a first optical detector 51, a second optical detector 52, a differential amplifier 6, and a processing unit 7. The optical system 4 includes a first lens 41, a second lens 42, a third lens 43, and a fourth lens 44.

The first light source 1 emits light L0. A laser light source such as a gas laser or a semiconductor laser may be used as the first light source 1. In order to perform coherent detection using first light L1 and second light L2, the first light source 1 preferably has high coherency. The light L0 emitted from the first light source 1 is guided through an optical fiber disposed between the first light source 1 and the first optical splitter 2.

The first optical splitter 2 splits the light L0 into two, i.e., the first light L1 and the second light L2. The first light L1 is part of the light from the first light source 1. The second light L2 is the remaining part of the light from the first light source 1 other than the first light L1. The first light L1 is guided through each of the M cores of the target object 13, and is then used as probe light for mode-dependent loss measurement. The second light L2 is guided through the M optical waveguides 23, and is then used as reference light, which interferes with the probe light for coherent detection.

The first light L1 is guided through an optical fiber disposed between the first optical splitter 2 and the second optical splitter 10. The second light L2 is guided through an optical fiber disposed between the first optical splitter 2 and the third optical splitter 20. In the following, a description may be omitted with respect to optical fibers disposed between optical components for guiding light.

The second optical splitter 10 splits the first light L1 into M beams, which are then injected into the respective polarization elements P1 through PM. The third optical splitter 20 splits the second light L2 into M beams, which are then injected into the respective polarization elements P2M+1 through P3M. The character "1" following the letter P in the reference characters for designating the polarization element P1 indicates the first polarization element. The character "M" following the letter P in the reference characters for designating the polarization element PM indicates the M-th polarization element. The characters "2M+1" in the reference characters indicates the ordinal number 2M+1-th (i.e., 2 times M plus 1). This system of notation will hereinafter be employed when an alphabet letter is followed by a number or a character "M".

A 3DB coupler or the like may be used as the first optical splitter 2, the second optical splitter 10, and the third optical splitter 20. A polarization element is an element used in an optical system that utilizes polarization. A polarizing beam splitter or the like may be used as each of the polarization elements P1 through P4M.

The M separated beams of the first light L1 are split into two orthogonal polarizations by the respective polarization elements P1 through PM, which results in 2M beams of the first light L1. The 2M beams of the first light L1 are injected into the respective optical modulators C1 through C2M while in pairs. In FIG. 1, a set of the optical modulators C1 through C2M are illustrated as a single element for the sake of convenience, rather than illustrating the optical modulators C1 through C2M individually.

The optical modulators C1 through C2M is an example of the first modulation unit that individually modulates the plurality of beams of the first light L1 guided through the M cores of the target object 13 before the first light L1 enters the M cores. In this embodiment, the optical modulators C1 through C2M individually modulate the 2M respective beams of the first light L1 guided through the M cores of the target object 13.

Electro-optic crystals with electro-optic effects may be used for the optical modulators C1 through C2M. The electro-optic effect refers to the phenomenon in which an optical constant such as a refractive index changes in response to a voltage applied to a transparent material. Examples of electro-optic crystals include KTN crystals, which are oxide crystals composed of potassium (K), tantalum (Ta), and niobium (Nb). The optical modulators C1 through C2M modulate the phase of the first light L1 by changing a refractive index according to an applied voltage. Although the first embodiment is described as using such phase modulation, the optical modulators C1 through C2M may alternatively modulate the amplitude of the first light L1. The same applies to the modulation of the second light L2, which will be described later.

The 2M beams of the first light L1 are labeled with respective phases each modulated differently depending on the combination of polarization and the sequence number of a guiding core.

Two orthogonal polarizations in each of the 2M beams of the first light L1 modulated by the optical modulators C1 through C2M are combined by a corresponding one of the polarization elements PM+1 through P2M. The term "combine" refers to the merging of two or more light beams into one light beam. Here, two orthogonal polarizations are combined, which causes the 2M beams of the first light L1 to turn into M beams of the first light L1.

The M beams of the first light L1 pass through the optical interface 11 and the first fan-in device 12 in this order to enter the M respective cores of the target object 13. The M beams of the first light L1 passing through M cores of the target object 13 exit from the exit end of the output-side MCF 132.

The M separated beams of the second light L2 are split into two orthogonal polarizations by the respective polarization elements P2M+1 to P3M, which results in 2M beams of the second light L2. The 2M beams of the second light L2 are injected into the respective optical modulators C2M+1 through C4M while in pairs. In FIG. 1, a set of the optical modulators C2M+1 through C4M are illustrated as a single element for the sake of convenience, rather than illustrating the optical modulators C2M+1 through C4M individually.

The optical modulators C2M+1 through C4M are an example of a second modulation unit that individually modulates the plurality of beams of the second light L2 guided through the M optical waveguides 23 before the second light L2 enters the M optical waveguides 23. In this embodiment, the optical modulators C2M+1 through C4M individually modulate the 2M respective beams of the second light L2 guided through the M optical waveguides 23.

Electro-optical crystals may be used for the optical modulators C2M+1 to C4M. The optical modulators C2M+1 through C4M modulate the phase of the second light L2 by changing a refractive index according to an applied voltage.

The 2M beams of the second light L2 are labeled with respective phases each modulated differently according to the combination of polarization and the sequence number of a guiding optical waveguide 23. Labeling the 2M beams of the first light L1 and labeling the 2M beams of the second light L2 enable an arithmetic operation to identify the 2M beams of the first light L1 based on signals received by the first and second optical detectors even when the first and second optical detectors are each a single photodiode receiving the 2M beams of the first light L1 at once.

Two orthogonal polarizations in each of the 2M beams of the second light L2 modulated by the respective optical modulators C2M+1 through C4M are combined by a corresponding one of the polarization elements P3M+1 through P4M. The 2M beams of the second light L2 are thus turned into M beams of the second light L2. The M beams of the second light L2 are coupled into the M respective optical waveguides 23 through the second fan-in device 22.

The M optical waveguides 23 are configured such that the positional arrangement of the optical waveguides as viewed in the direction in which the second light L2 is guided is geometrically similar to the positional arrangement of the cores of the target object 13 as viewed in the direction in which the first light L1 is guided. The term "geometrically similar" refers to the fact that the relative positional relationships between the M optical waveguides 23 are the same as the relative positional relationships between the M cores of the target object 13, and that the distances or the like between the M optical waveguides 23 are not necessarily the same as the distances between the M cores of the target object 13. The M beams of the second light L2 exit from the respective output ends of the M optical waveguides 23 after being guided through the M optical waveguides 23.

The optical waveguides 23 may include uncoupled multi-core optical fibers. When the optical waveguides 23 include uncoupled multi-core optical fibers, adjusting the intensity of the second light L2 injected into the second fan-in device 22 advantageously allows measurement errors caused by the second light L2 to be reduced in the complex transfer matrix of the first fan-in device 12 and the target object 13. The optical waveguides 23 may also include single-core optical fibers. When the M optical waveguides 23 include M single-core optical fibers, the M optical waveguides 23 are provided as a bundle of M single-core optical fibers. The optical waveguides 23 may alternatively include both uncoupled multi-core optical fibers and single-core optical fibers.

The first light L1 emitted from the M cores of the target object 13 travels through the first lens 41 to be incident on the surface of the optical element 3. The second light L2 emitted from the M optical waveguides 23 travels through the third lens 43 to be incident on the opposite surface of the optical element 3 from the surface on which the first light L1 is incident.

The optical element 3 transmits a partial amount of the first light L1 guided through the M cores of the target object 13 and a partial amount of the second light L2 guided through the M optical waveguides 23, respectively, and reflects the remaining amount. A half mirror, a cube beam splitter, or the like may be used as the optical element 3. From the viewpoint of performing coherent detection, the ratio of the amount of light reflected by the optical element 3 to the amount of light passing through the optical element 3 is preferably about 1:1.

Part of the first light L1 traveling through the first lens 41 is reflected by the optical element 3, and passes through the fourth lens 44 to be incident on the first optical detector 51. The remaining part of the first light L1 passes through the optical element 3 and then through the second lens 42 to be incident on the second optical detector 52.

Part of the second light L2 traveling through the third lens 43 is reflected by the optical element 3, and passes through the second lens 42 to be incident on the second optical detector 52. The remaining part of the second light L2 passes through the optical element 3 and then through the fourth lens 44 to be incident on the first optical detector 51.

The optical system 4 are configured to guide the first light L1 and the second light L2 such that the plurality of beams of the first light L1 and the plurality of beams of the second light L2 overlap each other in pairs on the first optical detector 51 and on the second optical detector 52. In the present application, the term "on the first optical detector 51" is synonymous with "on the light receiving surface" of the first optical detector 51, the surface receiving the light incident on the first optical detector 51. The term "on the second optical detector 52" is synonymous with "on the light receiving surface" of the second optical detector 52, the surface receiving the light incident on the second optical detector 52.

The adjustment mechanism 24 adjusts either the optical system 4 or the optical waveguides 23 such that the plurality of beams of the first light L1 and the plurality of beams of the second light L2 overlap each other in pairs on the first optical detector 51 and on the second optical detector 52.

In this embodiment, the adjustment mechanism 24 is a rotating mechanism. For example, the arrangement of the M beams of the second light L2 may be out of alignment with the arrangement of the M beams of the first light L1 in a rotational direction on the light-receiving surface of the first optical detector 51. In such a case, the adjustment mechanism 24 rotates the M optical waveguides 23 around an axis parallel to the light guiding direction. With this arrangement, the adjustment mechanism 24 is able to adjust the optical waveguides 23 such that the beams of the first light L1 and the beams of the second light L2 overlap each other in pairs.

The adjustment mechanism 24 is not limited to the rotating mechanism for the optical waveguides 23. For example, the optical system 4 may be zoom adjustable, and the adjustment mechanism 24 may adjust the zoom of the optical system 4. The M beams of the first light L1 may be arranged over a wider area than the M beams of the second light L2 on the light receiving surface of the first optical detector 51, which results in these two sets of light beams do not overlap each other. In such a case, the adjustment mechanism 24 adjusts the zoom of the optical system 4 such that the M beams of the first light L1 are arranged within a narrowed area. With this arrangement, the adjustment mechanism 24 is able to adjust the optical system 4 such that the plurality of beams of the first light L1 and the plurality of beams of the second light L2 overlap each other in pairs.

The first optical detector 51 outputs a first received signal v1 based on the first light L1 emitted from the M cores of the target object 13 and reflected by the optical element 3 and the second light L2 emitted from the M optical waveguides 23 and passing through the optical element 3. The first light L1 reflected by the optical element 3 and the second light L2 passing through the optical element 3 interfere with each other. The first optical detector 51 outputs an electric signal corresponding to the intensity of the interference light as the first received signal v1. A photodiode or the like may be used as the first optical detector 51.

The second optical detector 52 outputs a second received signal v2 based on the first light L1 emitted from M cores of the target object 13 and passing through the optical element 3 and the second light L2 emitted from M optical waveguides 23 and reflected by the optical element 3. The second light L2 reflected by the optical element 3 and the first light L1 passing through the optical element 3 interfere with each other. The first optical detector 51 outputs an electric signal corresponding to the intensity of the interference light as the second received signal v2. A photodiode or the like may be used as the second optical detector 52.

The differential amplifier 6 is an electric circuit that receives the first received signal v1 from the first optical detector 51 and the second received signal v2 from the second optical detector 52, and supplies, to the processing unit 7, a differential signal v3 obtained by amplifying a difference between the first received signal v1 and the second received signal v2 by a predetermined factor.

The processing unit 7 produces information about the mode-dependent loss of the target object 13 based on the first received signal v1 and the second received signal v2. The function of the processing unit 7 may be realized by a dedicated electric circuit. Part of the function may be provided by software running on a CPU (central processing unit). The function of the processing unit 7 may be realized by a plurality of circuits or a plurality of software programs. The processing unit 7 may also be provided with a memory for storing data such as various settings and the results of processing.

The processing unit 7 calculates a composite complex transfer matrix corresponding to the mode-dependent loss of the first fan-in device 12 and the target object 13 based on the complex spectrum of the differential signal v3, which is obtained from the first received signal v1 and the second received signal v2. The processing unit 7 outputs a ratio of the square of the maximum singular value and the square of the minimum singular value of the composite complex transfer matrix as the result of measurement, i.e., information about the mode-dependent loss.

The composite complex transfer matrix contains information about the correspondence between information about modulation by the optical modulators C1 through C2M and C2M+1 through C4M and the first and second received signals v1 and v2. This allows the processing unit 7 to calculate and output information about the mode-dependent loss separately for each of the M cores based on the first and second received signals v1 and v2 and the information about the modulation by the optical modulators C1 through C2M and C2M+1 through C4M.

The mode-dependent loss measurement apparatus 100 may have a second optical detector including M photodiodes in place of the second modulator such as the optical modulators C2M+1 through C4M. This is because the use of the output signals of the M photodiodes allows the second light L2 passing through the M optical waveguides 23 to be identified without using the second modulator.

From the viewpoint of ensuring high measurement accuracy, information identifying the polarization state of each beam of the first light and the second light is preferably available. It is even more preferable that the first light and the second light contain two polarizations that are orthogonal to each other.

The mode-dependent loss measurement apparatus 100 need not necessarily have the first light source 1. Light supplied from outside the mode-dependent loss measurement apparatus 100 may be used for measurement as the first light L1 and the second light L2.

<Example of Overlap of Core Image and Optical Waveguide Image>

Figure 2:
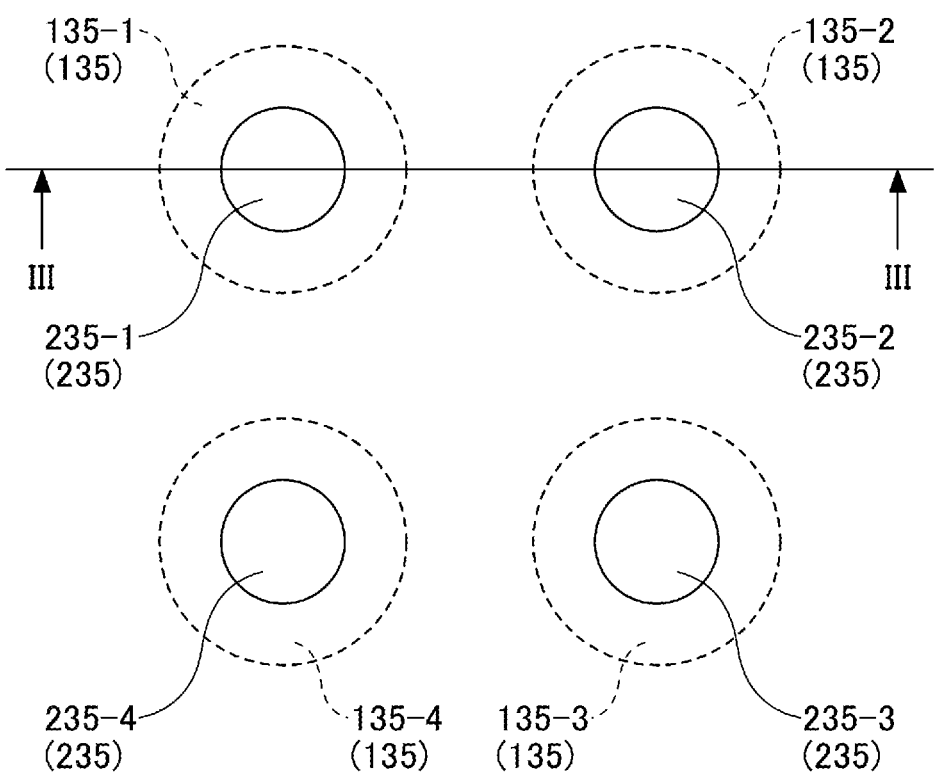
FIG. 2 is a drawing illustrating the core images of a target object and optical waveguide images on a first optical detector.
Figure 3:
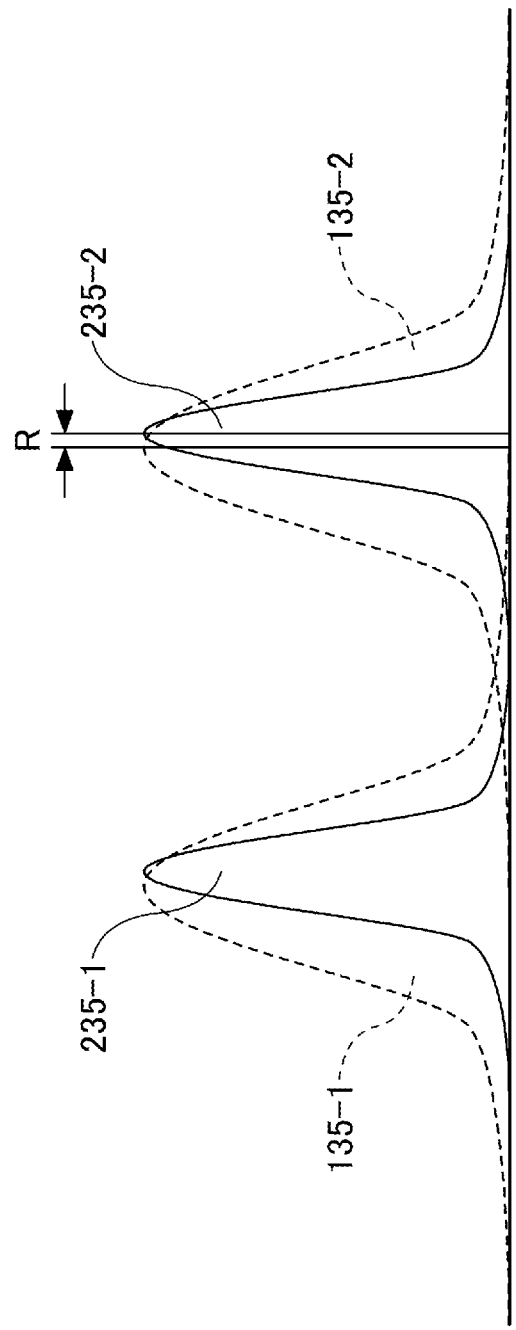
FIG. 3 is a drawing illustrating the intensity of light on the cross section along the line III-III in FIG. 2.

With reference to FIG. 2 and FIG. 3, an example of overlap between a core image and an optical waveguide image created by the optical system 4 will be described. FIG. 2 illustrates an example of the core image and optical waveguide image of a target object on the first optical detector of the mode-dependent loss measurement apparatus 100. FIG. 2 illustrates part of the light receiving surface of the first optical detector 51 in a plan view normal to the light receiving surface. FIG. 2 illustrates how a core image 135 and an optical waveguide image 235 of the target object 13 overlap on the first optical detector 51. FIG. 3 illustrates the intensity of light at the cross section taken along the line III-III in FIG. 2.

In FIG. 2 and FIG. 3, the core image 135 is an image of the exit ends of the output-side MCF 132 of the target object 13, formed on the first optical detector 51 by the combined optical system composed of the first lens 41 and the fourth lens 44. The optical waveguide image 235 is an image of the exit ends of the optical waveguides 23, formed on the first optical detector 51 by the combined optical system composed of the third lens 43 and the fourth lens 44.

In FIG. 2, the core image 135 includes a core image 135-1, a core image 135-2, a core image 135-3, and a core image 135-4. Dash-line circles of the core image 135 represent a contour line where the intensity of the first light L1 is $1/e^2$ of the peak light intensity. The letter "e" represents the base of the natural logarithm.

The optical waveguide image 235 includes an optical waveguide image 235-1, an optical waveguide image 235-2, an optical waveguide image 235-3, and an optical waveguide image 235-4. Solid-line circles of the optical waveguide image 235 represent a contour line where the intensity of the second light L2 becomes $1/e^2$ of the peak light intensity.

The optical waveguide image 235-1 is located inside the core image 135-1. The optical waveguide image 235-2 is located inside the core image 135-2. The optical waveguide image 235-3 is located inside the core image 135-3. The optical waveguide image 235-4 is located inside the core image 135-4. In this manner, the images overlap in pairs, the pairs being: the optical waveguide image 235-1 and the core image 135-1; the optical waveguide image 235-2 and the core image 135-2; the optical waveguide image 235-3 and the core image 135-3; and the optical waveguide image 235-4 and the core image 135-4.

As illustrated in FIG. 3, the cross-sectional light intensity of the optical waveguide image 235-1 is located inside the cross-sectional light intensity of the core image 135-1. The cross-sectional light intensity of the optical waveguide image 235-2 is located inside the cross-sectional light intensity of the core image 135-2. In this manner, the images overlap in pairs, the pairs being: the optical waveguide image 235-1 and the core image 135-1; and the optical waveguide image 235-2 and the core image 135-2.

As described above, the optical system 4 guides the first light L1 and the second light L2 such that the beams of the first light L1 and the beams of the second light L2 overlap in pairs on the first optical detector 51. The optical system 4 of the mode-dependent loss measurement apparatus 100 superimposes the first light L1 on the second light L2, thereby causing the first light L1 and the second light L2 to interfere with each other on both the first optical detector 51 and the second optical detector 52.

In the technology disclosed in Non-patent Document 1 and Non-patent Document 2, a composite complex transfer matrix HX represented by the following formula (1) is obtained when measurement is performed with respect to a target object sandwiched between a light input member such as a fan-in device and a light output member such as a fan-out device.

$$HX = Ho \cdot Hs \cdot Hi \quad (1)$$

In formula (1), Ho represents the complex transfer matrix of the light output member. Hs represents the complex transfer matrix of the target object. Hi represents the complex transfer matrix of the light input member.

Since the composite complex transfer matrix HX in formula (1) includes the complex transfer matrix Hi of the light input member and the complex transfer matrix Ho of the light output member, the mode-dependent loss obtained as the results of measurement based on formula (1) include both the mode-dependent loss of the light input member and the mode-dependent loss of the light output member.

In contrast, the mode-dependent loss measurement apparatus 100 according to the present embodiment does not have a light output member such as a fanout device. As a result, a composite complex transfer matrix H represented by formula (2) is obtained.

$$H = Hs \cdot Hi \quad (2)$$

Hi represents the complex transfer matrix of the first fan-in device 12 serving as a light input member.

Since the complex transfer matrix Ho of a light output member is not included in the composite complex transfer matrix H of formula (2), the mode-dependent loss of the light output member is not included in the mode-dependent loss obtained as the results of measurement based on formula (2). This embodiment thus provides an improvement in the reliability of measurement, compared with the case in which the mode-dependent loss of both the light input member and the light output member is included in the results of measurement.

The optical system 4 does not necessarily have to form the respective images of the exit ends of the M cores and the respective images of the exit ends of the M optical waveguides 23 on the first optical detector 51 and the second optical detector 52. This is because as long as the first light L1 and the second light L2 interfere with each other on the first optical detector 51 and the second optical detector 52, the improvement in the reliability of measurement is provided even without forming an image. Nonetheless, having the formed images of the exit ends of the cores and the optical waveguides 23 is preferable, because such images provide an easier clue to whether or not the two light beams are properly overlapping, thereby making it easier to perform the positional adjustment of the optical system 4 for superposition. As a result of enabling the easier positional adjustment of the optical system 4, the first light L1 and the second light L2 are easily superimposed on each other on both the first optical detector 51 and the second optical detector 52.

The adjustment mechanism 24 illustrated in FIG. 1 may be set such that the center-to-center distance R illustrated in FIG. 3 is less than or equal to 10% of the square root of sum of squares calculated for the mode field radii of the target object 13 and the optical waveguides 23. The center-to-center distance R refers to the distance between the center of a beam of the first light L1 and the center of a corresponding overlapping beam of the second light L2 on the first optical detector 51 and the second optical detector 52.

How the optical waveguide image 23S and the core image 13S overlap is not limited to the configuration in which the optical waveguide image 23S is included inside the core image 13S as illustrated in FIG. 2 and FIG. 3. The core image 13S may be included inside the optical waveguide image 23S. It suffices for the optical waveguide image 23S and the core image 13S to overlap at least partially so that the first light L1 and the second light L2 interfere with each other.

<Example of Removing Complex Transfer Matrix of First Fan-In Device>

In the present embodiment, removing the complex transfer matrix of the first fan-in device 12 from formula (2) serves to remove the mode-dependent loss of the first fan-in device 12 from the measured mode-dependent loss, thereby allowing the mode-dependent loss of the target object 13 to be measured. The operational procedure and arithmetic processing for removing the complex transfer matrix of the first fan-in device 12 will be described below.

As a first step, the mode-dependent loss measurement apparatus 100 performs measurement while the first light L1 is incident on each of the M cores of the target object 13 through the first fan-in device 12. As a result, the composite complex transfer matrix H represented by formula (2) is obtained.

As a second step, the target object 13 is removed from the arrangement used in the first step, and the mode-dependent loss measurement apparatus 100 performs measurement by causing the first light L1 to pass only through each single-mode optical fiber of the first fan-in device 12. As a result, the complex transfer matrix Hi of the first fan-in device 12 is obtained.

As a third step, the processing unit 7 of the mode-dependent loss measurement apparatus 100 multiplies (i.e., post-multiplies) the composite complex transfer matrix H of formula (2) on the right by the inverse matrix Hi_inv of the complex transfer matrix Hi of the first fan-in device 12 as illustrated in the following formula (3).

$$H \cdot Hi\_inv = Hs \cdot Hi \cdot Hi\_inv = Hs \quad (3)$$

The arithmetic operation shown in formula (3) provides the complex transfer matrix Hs of the target object 13 because Hi·Hi_inv is the identity matrix. The processing unit 7 of the mode-dependent loss measurement apparatus 100 produces the ratio of the square of the maximum singular value and the square of the minimum singular value of the complex transfer matrix Hs of the target object 13 as the result of measurement, i.e., information about the mode-dependent loss of the target object 13.

The method of removing the complex transfer matrix of the first fan-in device 12 is not limited to the method of performing the first through third steps described above. For example, the mode-dependent loss measurement apparatus 100 may obtain in advance the inverse matrix Hi_inv of the complex transfer matrix Hi of the first fan-in device 12, and store the obtained matrix in a memory in the processing unit 7. This inverse matrix Hi_inv corresponds to information about the complex transfer matrix Hi of the first fan-in device 12.

The processing unit 7 of the mode-dependent loss measurement apparatus 100 performs the arithmetic operation of formula (3) using the inverse matrix Hi_inv retrieved from the memory. This enables the mode-dependent loss measurement apparatus 100 to obtain the complex transfer matrix Hs of the target object 13 and to obtain the measurement result of the mode-dependent loss of the target object 13 from the complex transfer matrix Hs. This method simplifies the operational procedure for the mode-dependent loss measurement because the operation of the second step is unnecessary, compared with the method that performs the first through third steps.

Second Embodiment

In the following, a mode-dependent loss measurement apparatus 100a according to a second embodiment will be described. It should be noted that the same components as those in the previously described embodiment will be denoted by the same reference characters, and a duplicate description thereof may be omitted as appropriate. The same applies in other embodiments that will be described later.

Figure 4:
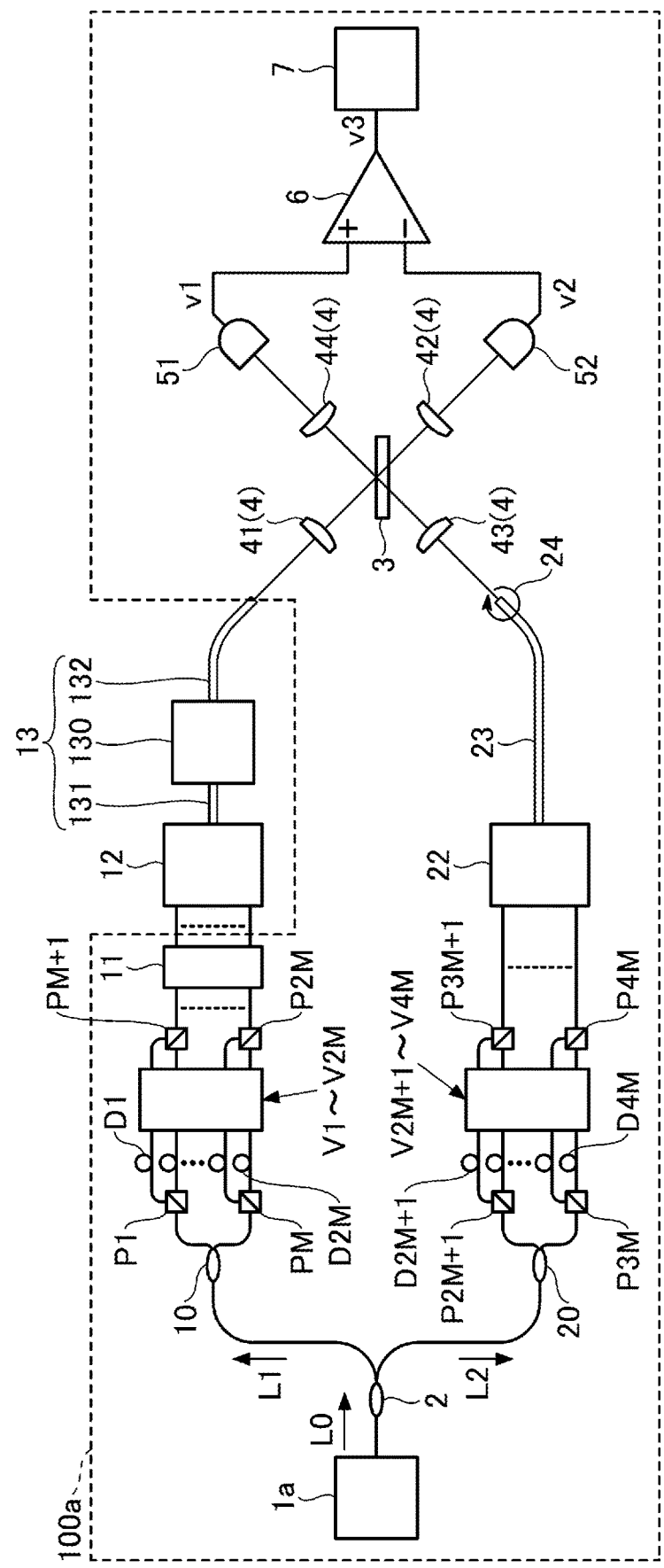
FIG. 4 is a drawing illustrating an example of the configuration of a mode-dependent loss measurement apparatus according to a second embodiment.

FIG. 4 illustrates an example of the configuration of the mode-dependent loss measurement apparatus 100a. The mode-dependent loss measurement apparatus 100a includes a first light source 1a, optical delay lines D1 through D4M, and variable optical attenuators V1 through V4M.

The first light source 1a is a tunable laser that is capable of generating continuous wavelength sweep in the emitted laser light. Light L0 from the first light source 1a is split into first light L1 and second light L2 by the first optical splitter 2.

The optical delay lines D1 through D2M are equipment, members, or both equipment and members that introduce respective optical delays to the 2M beams of the first light L1, which are output from the polarization elements P1 through PM generating two polarizations orthogonal to each other.

The first light source 1a provides continuous frequency sweep in each of the 2M beams of the first light L1. The optical delay lines D1 through D2M frequency-modulates the 2M respective beams of the first light L1 by optical delay.

The 2M beams of the first light L1 are labeled with frequencies each modulated differently depending on the combination of polarization and the sequence number of a guiding core. The first light source 1a and the optical delay lines D1 through D2M correspond to the first modulation unit.

The variable optical attenuators V1 through V2M are devices that variably attenuate the respective light intensities of the first light L1 passing through the respective optical delay lines D1 through D2M. The variable optical attenuators V1 through V2M are capable of separately adjusting the light intensities of the 2M respective beams of the first light L1.

The optical delay lines D2M+i through D4M are equipment, members, or both equipment and members that introduce respective optical delays to the 2M beams of the second light L2, which are output from the polarization elements P2M+1 through P3M generating two polarizations orthogonal to each other.

The first light source 1a provides continuous frequency sweep in each of the 2M beams of the second light L2. The optical delay lines D2M+1 through D4M frequency-modulates the 2M respective beams of the second light L2 by optical delay.

The 2M beams of the second light L2 are labeled with frequencies each modulated differently depending on the combination of polarization and the sequence number of a guiding optical waveguide 23. The first light source 1a and the optical delay lines D2M+1 through D4M correspond to the second modulation unit.

The variable optical attenuators V2M+1 through V4M are devices that variably attenuate the respective light intensities of the second light L2 passing through the respective optical delay lines D2M+1 through D4M. The variable optical attenuators V2M+1 through V4M are capable of separately adjusting the light intensities of the 2M respective beams of the second light L2.

The mode-dependent loss measurement apparatus 100a employs a different modulation method for labeling the first light L1 and the second light L2 than the mode-dependent loss measurement apparatus 100 according to the first embodiment. Nonetheless, the functions and advantageous effects are the same as those of the mode-dependent loss measurement apparatus 100.

The first light source 1a may include a tunable laser or a stabilized wavelength laser, and may further include an M-sequence modulation unit that applies binary phase-shift keying modulation with an M-sequence signal to the light from the tunable laser or the stabilized wavelength laser. Such a first light source 1a is advantageous in that the output stability of the emitted light is higher, compared with the case of continuous frequency sweep.

<Example of Complex Spectrum Output of Differential Amplifier>

In the present embodiment, the first light source 1a and the optical delay lines D1 through D2M modulate the first light L1 with the first through 2M-th modulation signals. The first light source 1a and the optical delay lines D2M+1 through D4M modulate the second light L2 with the 2M+1-th through 4M-th modulation signals. The product of the m-th and n-th modulation signals belonging to the first through 4M-th modulation signals is a linear combination of the i-th and j-th functions included in an orthogonal function system.

The modulation signals used in modulation by the first light source 1a and the optical delay lines D1 through D4M are represented by complex exponential functions. Therefore, the product of different modulation signals is a linear combination of a cosine function and a sine function forming an orthogonal function system. In this case, the frequency of the m-th modulation signal for the first light L1 is set to fm, and the frequency of the n-th modulation signal for the second light L2 is set to fn. The product of these modulation signals is a linear combination of the i-th and j-th functions belonging to the orthogonal function system {cos (2π·fi·t), sin(2π·fj·t)}. The relationship between these frequencies is expressed by the following formula (4):

$$fi=fj=f\Delta+fm-fn \qquad (4)$$

According to formula (4), the complex spectrum output by the differential amplifier 6 is illustrated in FIGS. 5A and 5B. FIGS. 5A and 5B illustrate an example of the complex spectrum output by the differential amplifier 6. FIG. 5A illustrates the cosine component of the complex spectrum, and FIG. 5B illustrates the sine component of the complex spectrum. The horizontal axis in FIGS. 5A and 5B represents frequency. Co1 through Co10 represent the cosine component output. Si1 through Si10 represent the sine component output.

The processing unit 7 utilizes the relationship between the frequencies of the two modulation signals and the frequency of the signal obtained as the product of the two modulation signals to determine the mn element of the complex transfer matrix based on the magnitude of a corresponding complex spectrum.

The fact that the product of the m-th and n-th modulation signals belonging to the first to 4M-th modulation signals is a linear combination of the i-th and j-th functions included in the orthogonal function system is also applicable to the mode-dependent loss measurement apparatuses of the first embodiment and subsequent embodiments. Such configurations provide the same functions and advantageous effects as those of the present embodiment.

Third Embodiment

Figure 6:
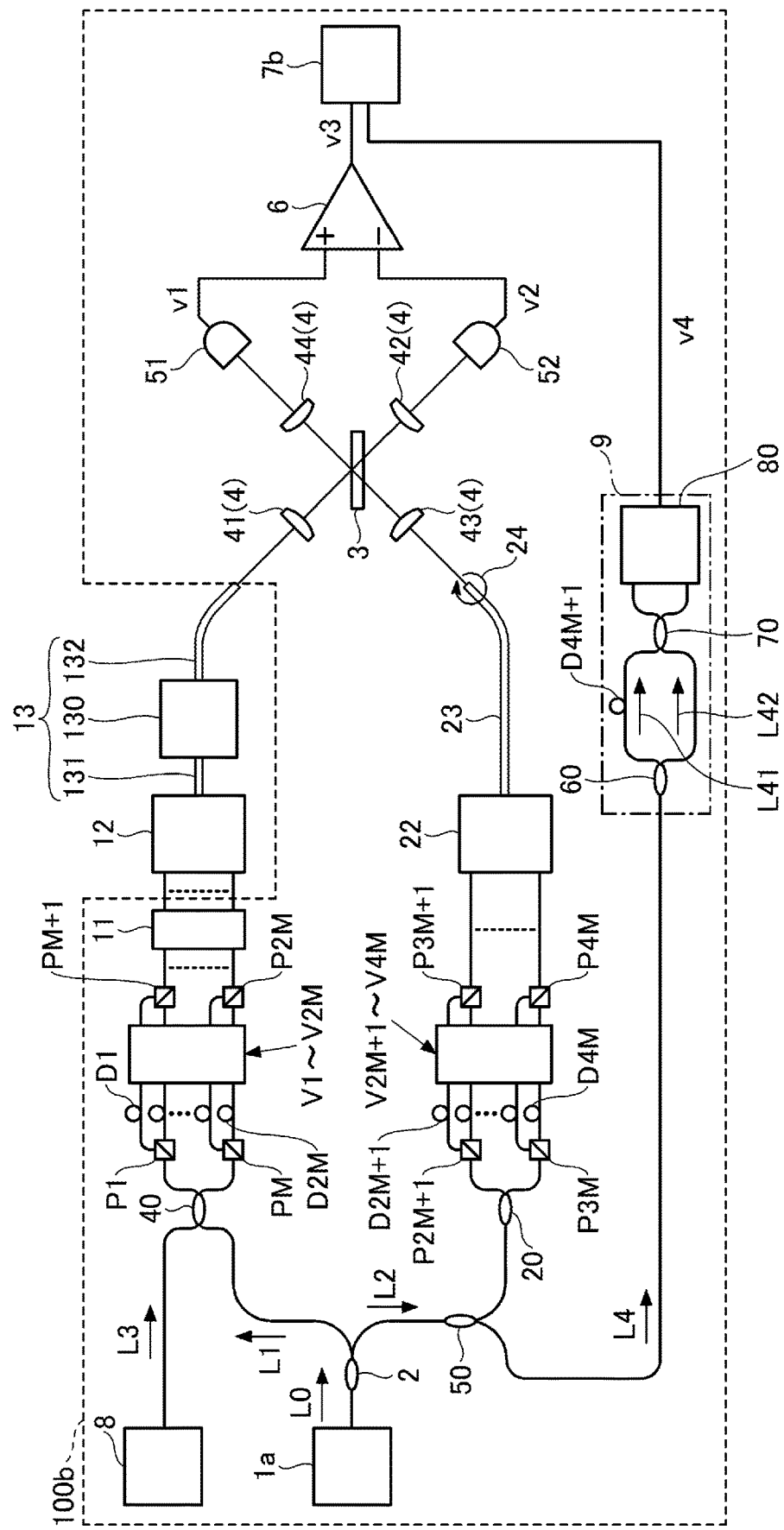
FIG. 6 is a drawing illustrating an example of the configuration of a mode-dependent loss measurement apparatus according to a third embodiment.

In the following, a mode-dependent loss measurement apparatus 100b according to the third embodiment will be described. FIG. 6 illustrates an example of the configuration of the mode-dependent loss measurement apparatus 100b. The mode-dependent loss measurement apparatus 100b includes a second light source 8, an optical combiner and splitter 40, a fourth optical splitter 50, a self-delay interferometer 9, and a processing unit 7b. The self-delay interferometer 9 has a fifth optical splitter 60, an optical delay line D2M+1, an optical combiner 70, and a balanced detector 80.

When the target object 13 is an erbium-doped optical fiber amplifier, for example, background light to reproduce the wavelength multiplexed light that determines the operating conditions of the target object 13 is required separately from the first light L1 used for measurement. The second light source 8 of the mode-dependent loss measurement apparatus 100b emits background light L3. The background light L3 is injected into the optical combiner and splitter 40. The optical combiner and splitter 40 combines the first light L1 from the first light source 1a and the background light L3 from the second light source 8, and splits the combined light into M light beams, which are coupled into the M cores of the target object 13. The mode-dependent loss measurement apparatus 100b performs measurements using the M beams of the first light L1 combined with the background light L3.

The second light source 8 may be a wavelength multiplexed light source or an optical comb light source to create various operating conditions of the target object 13. The wavelength multiplexed light source uses an arrayed waveguide grating (AWG) to combine light from multiple distributed feedback (DFB) lasers oscillating at different wavelengths. The optical comb light source is a laser light source that is capable of emitting light having comb-tooth frequency spectrum, i.e., frequency spectrum consists of a series of discrete, equally spaced frequency lines. Similarly to the case of the first light source 1a, the mode-dependent loss measurement apparatus 100b does not necessarily have a second light source 8, and may use the background light L3 that is extracted from light supplied from outside the mode-dependent loss measurement apparatus 100b.

The optical combiner and splitter 40 is an example of a light combining member that combines the background light L3 from the second light source 8 and the first light L1 from the first light source 1a. A 3DB coupler or the like may be used as the optical combiner and splitter 40.

The self-delay interferometer 9 compensates for the phase noise of the light L0 emitted from the first light source 1a. The fourth optical splitter 50 of the mode-dependent loss measurement apparatus 100b splits the second light L2 from the first optical splitter 2, and monitoring light L4 split from the second light L2 is injected into the fifth optical splitter 60.

The self-delay interferometer 9 constitutes a Mach-Zehnder interferometer. The self-delay interferometer 9 may alternatively constitute an interferometer other than a Mach-Zehnder interferometer.

The fifth optical splitter 60 of the self-delay interferometer 9 splits the monitoring light L4 into two beams. The optical delay line D2M+1 of the self-delay interferometer 9 introduces a delay shorter than the coherence length of the light L0 to one of the two beams designated as first monitoring light L41.

The optical combiner 70 of the self-delay interferometer 9 combines the delayed first monitoring light L41 and the other one of the two beams generated by fifth optical splitter 60, which is designated as second monitoring light L42. Combining the first monitoring light L41 and the second monitoring light L42 generates a beat wave having a beat frequency. The balanced detector 80 of the self-delay interferometer 9 detects the frequency of the beat wave, which is then supplied as a detection signal v4 to the processing unit 7b.

The detection signal v4 from the balanced detector 80 serves as the output of the self-delay interferometer 9 that is based on the light L0 from the first light source 1a. The processing unit 7b performs an arithmetic operation to compensate for the effect of the phase noise of the light L0 in the differential signal v3 based on the detection signal v4.

Fourth Embodiment

Figure 7:
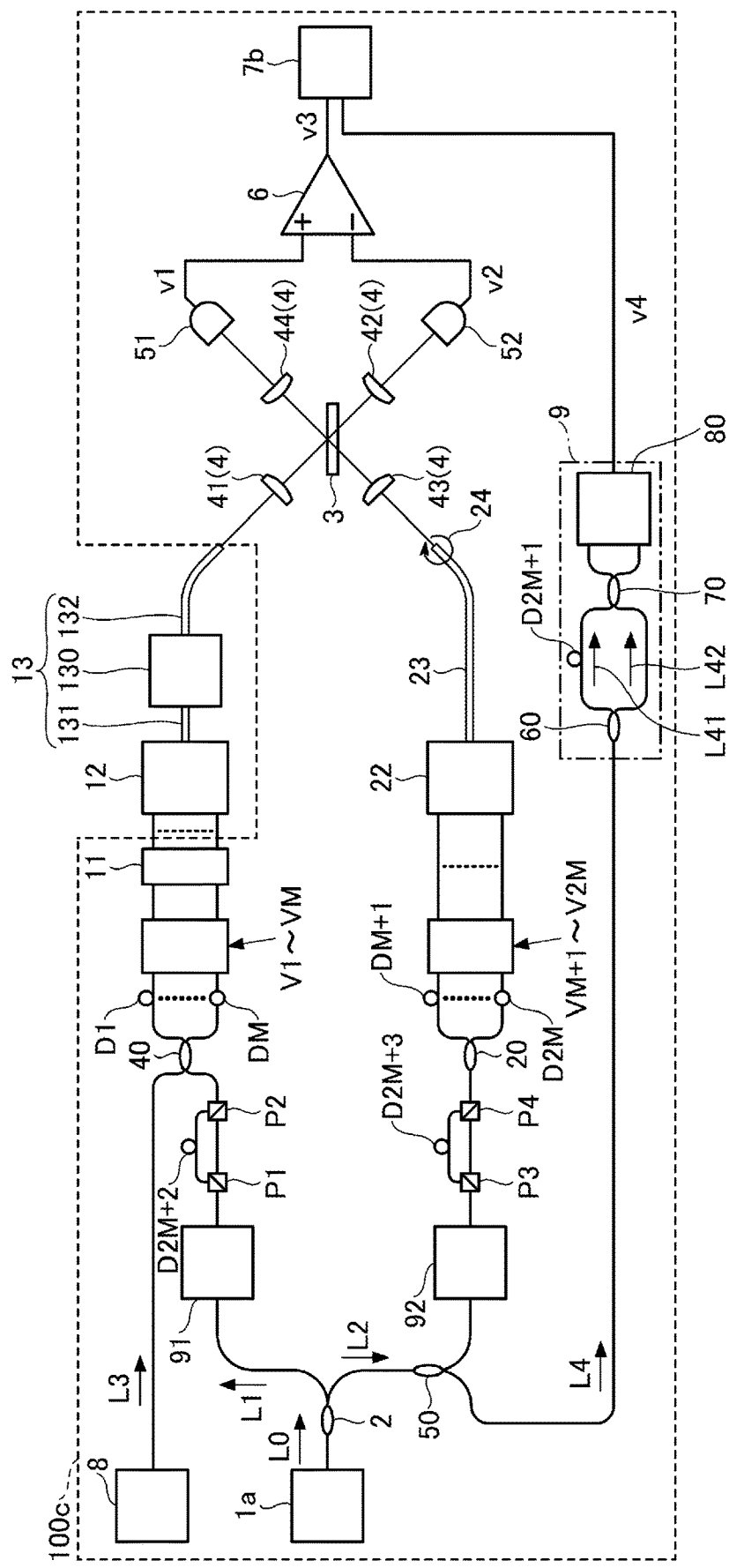
FIG. 7 is a drawing illustrating an example of the configuration of a mode-dependent loss measurement apparatus according to a fourth embodiment.

In the following, a mode-dependent loss measurement apparatus 100c according to a fourth embodiment will be described. FIG. 7 illustrates an example of the configuration of the mode-dependent loss measurement apparatus 100c. The mode-dependent loss measurement apparatus 100c includes a first polarization controller 91 and a second polarization controller 92.

The first polarization controller 91 is capable of controlling the direction of polarization of the first light L1 supplied from the first optical splitter 2. The first polarization controller 91 is capable of adjusting the intensity of the first light L1 by controlling the direction of polarization of the first light L1.

The second polarization controller 92 is capable of controlling the direction of polarization of the second light L2 supplied from the first optical splitter 2. The second polarization controller 92 is capable of adjusting the intensity of the second light L2 by controlling the direction of polarization of the second light L2.

The first light L1 passing through the first polarization controller 91 is split by the polarization element P1 into two polarizations that are orthogonal to each other. The two polarizations are combined by the polarization element P2 after one of the polarizations is optically delayed by the optical delay line D2M+2.

After the optical delay is introduced between the two polarizations that are orthogonal in the first light L1, the optical delay lines D1 through DM impose respective optical delays to, and demodulate, the M beams of the first light L1 into which the first light L1 is split by the optical combiner and splitter 40. The optical delay lines D2M+2 and D1 through DM correspond to the first modulation unit. Alternatively, one of the optical delay lines D1 through DM may be replaced with an optical line without any substantially delay, such that one of the M beams is not delayed while the remaining M−1 beams are delayed.

The second light L2 passing through the second polarization controller 92 is split by the polarization element P3 into two polarizations that are orthogonal to each other. The two polarizations are combined by the polarization element P4 after one of the polarizations is optically delayed by the optical delay line D2M+3.

After the optical delay is introduced between the two polarizations that are orthogonal in the second light L2, the optical delay lines DM+1 through D2M imposes respective optical delays to, and demodulate, the M beams of the second light L2 into which the second light L2 is split by the third optical splitter 20. The optical delay lines D2M+3 and DM+1 through D2M correspond to the second modulation unit. Alternatively, one of the optical delay lines DM+1 through D2M may be replaced with an optical line without any substantially delay, such that one of the M beams is not delayed while the remaining M−1 beams are delayed.

With the arrangement described above, the number of components for introducing optical delays is reduced compared with the case in which the optical delay lines for introducing optical delays to the 2M beams of the first light and the 2M beams of the second light are provided separately. The components for introducing optical delays are optical delay lines, polarization elements, and variable optical attenuators in this example, but are not limited thereto.

While the embodiments and variations have heretofore been described, any aspects of the disclosed embodiments should be considered to be examples only, and be non-limiting. The scope of the invention is not defined by these examples, but defined by the claims, and is intended to include all modifications within the literal as well as equivalent scope of the claims.

Numbers such as ordinals, quantities, etc. used in the description of the embodiments are examples only, used for the purpose of illustrating the technical configurations of the invention, and the invention is not limited to these illustrated numbers.

What is claimed is:

1. A mode-dependent loss measurement apparatus for measuring a target object containing M cores each guiding light, where M is a natural number greater than or equal to two, comprising:

M optical waveguides;

an optical element configured to transmit a partial amount of first light guided through the M cores of the target object and a partial amount of second light guided through the M optical waveguides, and to reflect remaining amount thereof;

a first modulation unit configured to individually modulate a plurality of beams of the first light guided through the M cores before entering the M cores;

a first optical detector configured to output a first received signal based on the first light emitted from the M cores and reflected by the optical element and the second light emitted from the M optical waveguides and passing through the optical element;

a second optical detector configured to output a second received signal based on the first light emitted from the M cores and passing through the optical element and the second light emitted from the M optical waveguides and reflected by the optical element;

an optical system configured to guide the first light and the second light such that the plurality of beams of the first light and a plurality of beams of the second light overlap in pairs on the first optical detector and the second optical detector, and processing circuitry configured to output information about mode-dependent loss of the target object based on the first received signal, the second received signal, and information about modulation given by the first modulation unit.

2. The mode-dependent loss measurement apparatus according to claim 1, wherein the plurality of beams of the first light are injected into the M cores through a light input member, and the processing circuitry is configured to output the information about the mode-dependent loss of the target object further based on information about a complex transfer matrix of the light input member acquired in advance.

3. The mode-dependent loss measurement apparatus according to claim 1, wherein the optical system forms images of exit ends of the M cores and images of exit ends of the M optical waveguides on the first optical detector and the second optical detector.

4. The mode-dependent loss measurement apparatus according to claim 1, further comprising an adjustment mechanism configured to make an adjustment of either the optical system or the M optical waveguides such that the plurality of beams of the first light and the plurality of beams of the second light overlap in pairs on each of the first optical detector and the second optical detector, wherein the adjustment mechanism is configured to make the adjustment such that a beam-center-to-beam-center distance between the first light and the second light on each of the first optical detector and the second optical detector is less than or equal to 10% of a square root of sum of squares calculated for mode field radii of the target object and the M optical waveguides.

5. The mode-dependent loss measurement apparatus according to claim 1, wherein the M optical waveguides include uncoupled multi-core optical fibers.

6. The mode-dependent loss measurement apparatus according to claim 1, wherein the M optical waveguides include single-core optical fibers.

7. The mode-dependent loss measurement apparatus according to claim 1, further comprising a second modulation unit configured to individually modulate the plurality of beams of the second light guided through the M optical waveguides before entering the M optical waveguides, wherein the processing circuitry is configured to output the information about the mode-dependent loss of the M cores further based on information about modulation given by the second modulation unit.

8. The mode-dependent loss measurement apparatus according to claim 7, wherein the first light and the second light each includes two orthogonal polarizations, and wherein the first modulation unit is configured to modulate 2M beams of the first light that correspond to the two orthogonal polarizations of the plurality of beams of the first light guided through the M cores, and the second modulation unit is configured to modulate 2M beams of the second light that correspond to the two orthogonal polarizations of the plurality of beams of the second light guided through the M optical waveguides.

9. The mode-dependent loss measurement apparatus according to claim 8, wherein the first modulation unit introduces respective optical delays to the 2M beams of the first light, and wherein the second modulation unit introduces respective optical delays to the 2M beams of the second light.

10. The mode-dependent loss measurement apparatus according to claim 8, wherein an optical delay is introduced between two orthogonal polarizations in the first light, and, thereafter, the first modulation unit introduces respective optical delays to at least M−1 beams among M beams of the first light obtained by splitting the first light, and wherein an optical delay is introduced between two orthogonal polarizations in the second light, and, thereafter, the second modulation unit introduces respective optical delays to at least M−1 beams among M beams of the second light obtained by splitting the second light.

11. The mode-dependent loss measurement apparatus according to claim 8, wherein the first modulation unit is configured to modulate the first light with first through 2M-th modulation signals, and the second modulation unit is configured to modulate the second light with 2M+1-th through 4M-th modulation signals, and wherein a product of m-th and n-th modulation signals belonging to the first through 4M-th modulation signals is a linear combination of i-th and j-th functions belonging to an orthogonal function system.

12. The mode-dependent loss measurement apparatus according to claim 1, further comprising a first light source, wherein the first light is part of light from the first light source, and the second light is a remaining part of the light from the first light source other than the first light.

13. The mode-dependent loss measurement apparatus according to claim 12, wherein the first light source includes a tunable laser capable of generating continuous wavelength sweep in emitted laser light.

14. The mode-dependent loss measurement apparatus according to claim 12, wherein the first light source includes:

a tunable laser or a stabilized wavelength laser; and an M-sequence modulation unit configured to apply binary phase-shift keying modulation with an M-sequence signal to light from the tunable laser or the stabilized wavelength laser.

15. The mode-dependent loss measurement apparatus according to claim 12, further comprising:

a second light source; and a light combining member, wherein the light combining member is configured to combine light from the second light source with the first light from the first light source, and light generated by the light combining member is injected into each of the M cores.

16. The mode-dependent loss measurement apparatus according to claim 12, further comprising a self-delay interferometer,
wherein the processing circuitry is configured to compensate for phase noise of the light from the first light source based on an output of the self-delay interferometer responsive to the light from the first light source.

17. A mode-dependent loss measurement method implemented by a mode-dependent loss measurement apparatus for measuring a target object containing M cores each guiding light where M is a natural number greater than or equal to two, comprising:
causing an optical element to transmit a partial amount of first light guided through the M cores of the target object and a partial amount of second light guided through M optical waveguides, and to reflect remaining amount thereof;
causing a first modulation unit to individually modulate a plurality of beams of the first light guided through the M cores before entering the M cores;
causing a first optical detector to output a first received signal based on the first light emitted from the M cores and reflected by the optical element and the second light emitted from the M optical waveguides and passing through the optical element;
causing a second optical detector to output a second received signal based on the first light emitted from the M cores and passing through the optical element and the second light emitted from the M optical waveguides and reflected by the optical element; and
causing an optical system to guide the first light and the second light such that the plurality of beams of the first light and a plurality of beams of the second light overlap in pairs on the first optical detector and the second optical detector, and
causing processing circuitry to output information about mode-dependent loss of the target object based on the first received signal, the second received signal, and information about modulation given by the first modulation unit.

18. The mode-dependent loss measurement method according to claim 17, wherein the plurality of beams of the first light are injected into the M cores through a light input member, and the mode-dependent loss measurement method further comprises causing the processing circuitry to:
obtain a composite complex transfer matrix of the light input member and the target object based on the first light passing through the light input member and the target object;
obtain a complex transfer matrix of the light input member based on the first light passing through the light input member, without passing through the target object;
obtain a complex transfer matrix of the target object by post-multiplying the composite complex transfer matrix by an inverse matrix of the complex transfer matrix of the light input member; and
output the information about the mode-dependent loss of the target object based on the complex transfer matrix of the target object.

* * * * *